United States Patent [19]

Peterson et al.

[11] Patent Number: 5,615,451
[45] Date of Patent: Apr. 1, 1997

[54] ROLLER ASSEMBLY LIFT MECHANISM

[75] Inventors: Virgil D. Peterson, Bloomington; Gary W. Andert, Rosemount; Rollin D. Botts, Bloomington, all of Minn.

[73] Assignee: Sico Incorporated, Minneapolis, Minn.

[21] Appl. No.: 543,821

[22] Filed: Oct. 16, 1995

Related U.S. Application Data

[63] Continuation of Ser. No. 179,112, Jan. 10, 1994.

[51] Int. Cl.$^6$ ........................................ B60B 33/00
[52] U.S. Cl. .................. 16/34; 248/188.2; 52/126.1; 52/7; 280/43.14
[58] Field of Search ................... 16/32, 33, 34, 16/19; 52/7, 126.1; 248/188.2; 280/43.14

[56] References Cited

U.S. PATENT DOCUMENTS

| | | |
|---|---|---|
| Re. 24,454 | 4/1958 | Wilson . |
| 89,306 | 4/1869 | Goodher . |
| 146,997 | 2/1874 | Eddy ............................................. 16/34 |
| D. 304,499 | 11/1989 | Rogers et al. . |
| 770,152 | 9/1904 | Bechtel . |
| 1,063,620 | 6/1913 | Thornley ...................................... 16/33 |
| 1,370,732 | 3/1921 | Corbett . |
| 1,902,166 | 3/1933 | Harter ........................................... 16/34 |
| 2,042,489 | 6/1936 | Williams ............................. 280/43.14 |
| 2,508,627 | 5/1950 | Spiegel et al. . |
| 2,721,778 | 10/1955 | Wilson . |
| 2,747,958 | 5/1956 | Wilson . |
| 2,764,460 | 9/1956 | Nelson . |
| 2,766,089 | 10/1956 | Nielsen . |
| 2,771,937 | 11/1956 | Wilson . |
| 2,812,189 | 11/1957 | Geldhof ................................ 280/43.14 |

(List continued on next page.)

FOREIGN PATENT DOCUMENTS

| | | | |
|---|---|---|---|
| 60-244601 | 12/1985 | Japan ........................................ 16/32 |
| 4-8603 | 1/1992 | Japan ........................................ 16/34 |
| 4-71903 | 3/1992 | Japan ........................................ 16/19 |
| 8836 | of 1906 | United Kingdom ........................ 16/32 |
| 450249 | 7/1936 | United Kingdom ........................ 16/32 |
| 624303 | 6/1949 | United Kingdom ................. 280/43.14 |

*Primary Examiner*—M. Rachuba
*Assistant Examiner*—Donald M. Gurley
*Attorney, Agent, or Firm*—Merchant, Gould, Smith, Edell, Welter & Schmidt

[57] ABSTRACT

A stage or other structure having support legs includes rollers which are mounted so as to be supporting the stage in a first position and having the stage legs support the stage in a second position. A lift mechanism includes actuating pedals near the ground for raising and lowering the assembly. A linkage pivots the roller mounting member between a raised and lowered position relative to a cross member on the frame. A second pedal is selectively engageable by a single foot for retaining the roller assembly in either the raised or lowered positions.

15 Claims, 11 Drawing Sheets

U.S. PATENT DOCUMENTS

| | | |
|---|---|---|
| 2,831,741 | 4/1958 | Wilson . |
| 2,873,157 | 2/1959 | Wilson . |
| 2,969,245 | 1/1961 | Wilson . |
| 2,978,754 | 4/1961 | Wilson . |
| 2,983,968 | 5/1961 | Wurn . |
| 2,993,740 | 7/1961 | Good . |
| 3,028,197 | 4/1962 | Wilson . |
| 3,075,809 | 1/1963 | Wilson . |
| 3,080,833 | 3/1963 | Risdall . |
| 3,099,480 | 7/1963 | Wilson . |
| 3,179,438 | 4/1965 | Field ................................... 280/43.14 |
| 3,245,363 | 4/1966 | Amthor et al. . |
| 3,276,401 | 10/1966 | Wilson et al. . |
| 3,337,262 | 8/1967 | Katzfey et al. . |
| 3,351,029 | 11/1967 | Bue . |
| 3,437,058 | 4/1969 | Bue . |
| 3,476,061 | 11/1969 | Takahashi . |
| 3,557,720 | 1/1971 | Blink et al. . |
| 3,799,073 | 3/1974 | Nielsen . |
| 3,861,325 | 1/1975 | Bue et al. . |
| 3,999,491 | 12/1976 | Wilson . |
| 4,026,221 | 5/1977 | Wilson et al. . |
| 4,054,096 | 10/1977 | Wilson et al. . |
| 4,074,636 | 2/1978 | Wilson . |
| 4,133,271 | 1/1979 | Carlson . |
| 4,232,488 | 11/1980 | Hanley . |
| 4,327,650 | 5/1982 | Bue . |
| 4,570,751 | 2/1986 | Kleu . |
| 4,779,542 | 10/1988 | Staten et al. . |
| 4,863,126 | 9/1989 | Rogers et al. . |
| 4,872,295 | 10/1989 | Fujita . |
| 4,917,217 | 4/1990 | Rogers et al. . |
| 4,934,113 | 6/1990 | Hall et al. . |
| 4,949,649 | 8/1990 | Terres et al. . |
| 4,979,340 | 12/1990 | Wilson et al. . |
| 5,325,640 | 7/1994 | Luedke ......................................... 52/7 |
| 5,347,682 | 9/1994 | Edgerton, Jr. ................................ 16/32 |

ROLLER ASSEMBLY LIFT MECHANISM

This is a continuation of application Ser. No. 08/179,112 filed Jan. 10, 1994.

BACKGROUND OF THE INVENTION

1. Field of the Invention

The present invention is directed to an apparatus for lifting a first member relative to a second member, and in particular to a device for raising and lowering a roller apparatus.

2. Description of the Prior Art

Roller apparatuses which may be used with various pieces of equipment for selectively engaging the ground for rolling the equipment are well-known. Such a device includes one or more rollers or casters which may be mounted singly or along a mounting bar and may be lowered and raised between an engaging and non-engaging position. The rollers are moved between a raised position wherein the supported device has its legs on the floor and cannot be rolled and lowered position wherein the legs are lifted from the floor and the rollers support the equipment.

Prior roller apparatuses have required workers to bend over and reach under the stage for actuating, lifting or lowering the rollers by pushing or pulling on a handle near the ground. Other attempts to ease actuation have utilized an extended handle which is raised somewhat so that an operator need not bend over as far. However, these devices still require reaching under a stage or other device to its support structure and actuating the handle by hand, which may require a great deal of strength. This may cause strain to the worker and is inconvenient as well as difficult.

It can be seen then that a roller apparatus would have increased utility if it did not require bending over to actuate. It can be seen that if such a mechanism could be operated by foot rather than by hand, it would provide easier operation. The present invention addresses these and other problems associated with raisable roller assemblies.

SUMMARY OF THE INVENTION

The present invention relates to a roller assembly lift mechanism as may be used with mobile equipment, such as a stage, having rollers which can be moved between a raised and lowered position. The lift mechanism moves the roller assembly up and down so that the supporting legs of the equipment may be raised from the ground and the stage may be rolled.

The roller assembly is pivotally connected to a frame member of the mobile equipment. The roller assembly and the frame are mounted by a number of links for pivoting the frame about the roller assembly. A foot operated pedal provides mechanical advantage to pivot the links up and down for raising and lowering the frame relative. A first pedal is used to pivot the frame up and down and a second pedal is used to engage or disengage a stop member for limiting motion of the frame. The stop is selectively engageable so that it may be engaged to lift the stage from the ground and disengaged to lower the stage. In a preferred embodiment, both pedals are located near the floor and may be operated at the same time with one foot.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

In the drawings, wherein like reference letters and numerals indicate corresponding elements throughout the several views.

DETAILED DESCRIPTION OF THE PREFERRED EMBODIMENT(S)

Figure 1:
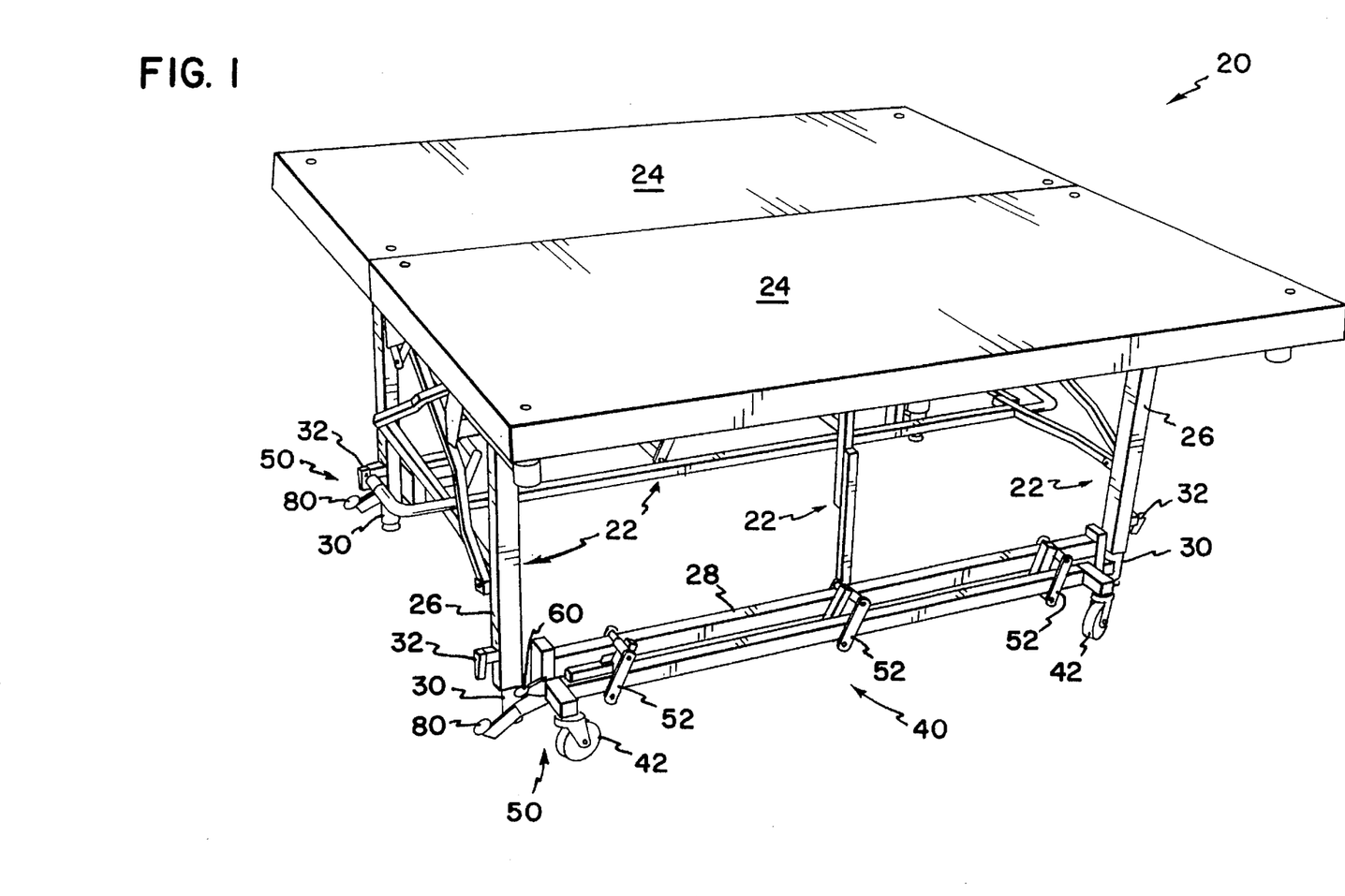
FIG. 1 shows a perspective view of a mobile folding stage having a roller assembly and a lift mechanism according to the principles of the present invention.

Referring now to the drawings, wherein like reference numerals designate corresponding structure throughout the several views, and referring in particular to FIG. 1, there is shown a mobile stage, generally designated 20. Although a stage is shown, other large mobile structures, such as tables or bleachers, could also be utilized with the present invention. The stage 20 includes stage panels 24 mounted over a frame 22. The frame 22 includes support legs 26 at each corner. Frame cross members 28 extend between each of the two pairs of legs 26. In order to be mobile, the stage 20 includes a pair of roller assemblies 40. The roller assemblies 40 include a mounting bar 44 having rollers or casters 42 mounted thereon. The mounting bar 44 pivotally mounts to the frame cross member 28 on pivot links 52, as explained hereinafter.

The roller assembly 40 is adjustable between a raised and lowered position. With the roller assembly 40 in the raised position, the legs 26 engage the floor and support the stage 20 so that the stage 20 is firmly set and will not move. With the roller assembly 40 in the lowered position, the legs 26 are raised from the floor and the stage 20 is supported by rollers 42 and is free to roll.

Figure 2:
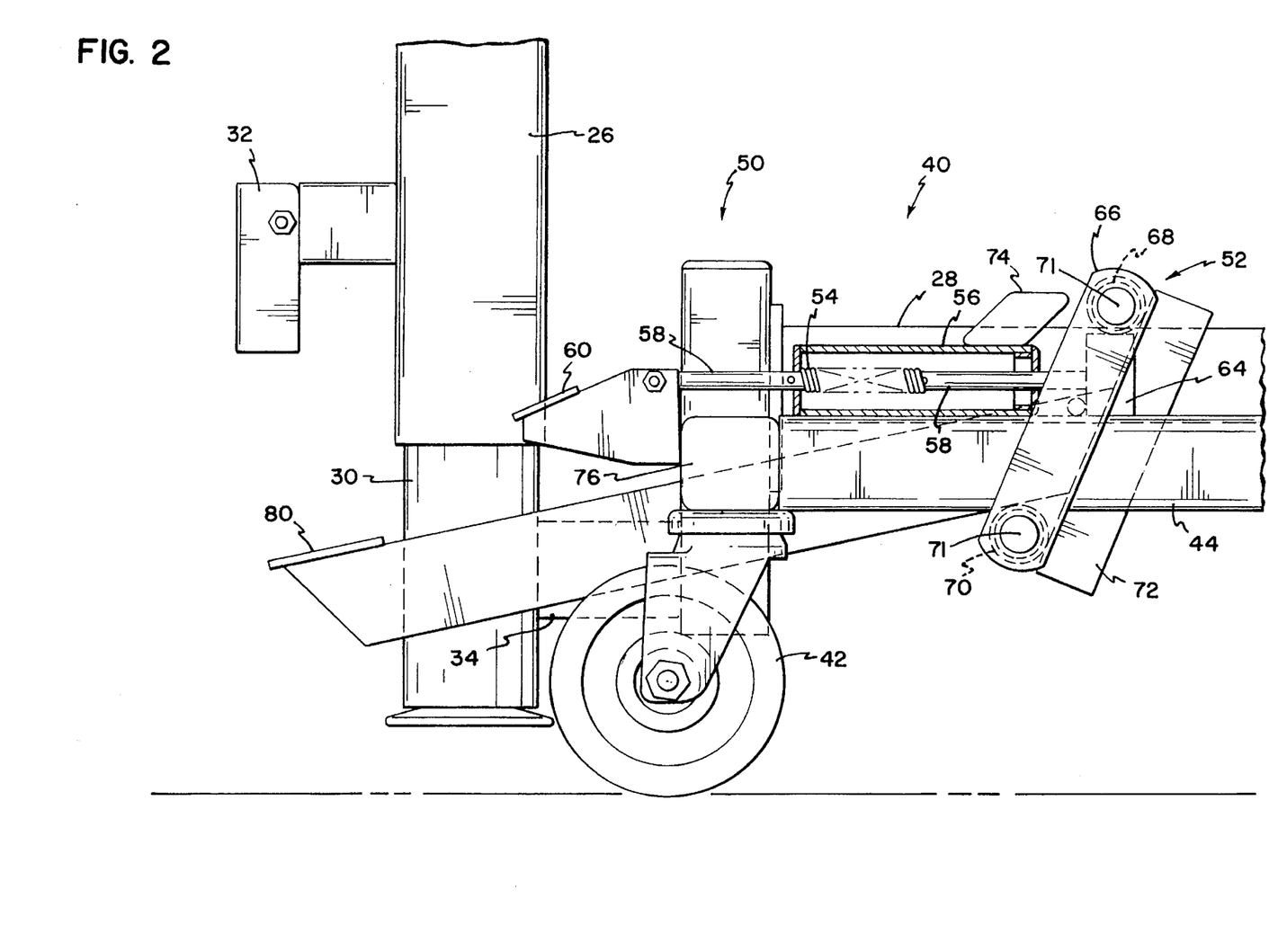
FIG. 2 shows a side elevational view of the lift mechanism for the stage shown in FIG. 1 with the stage in a raised position.
Figure 7:
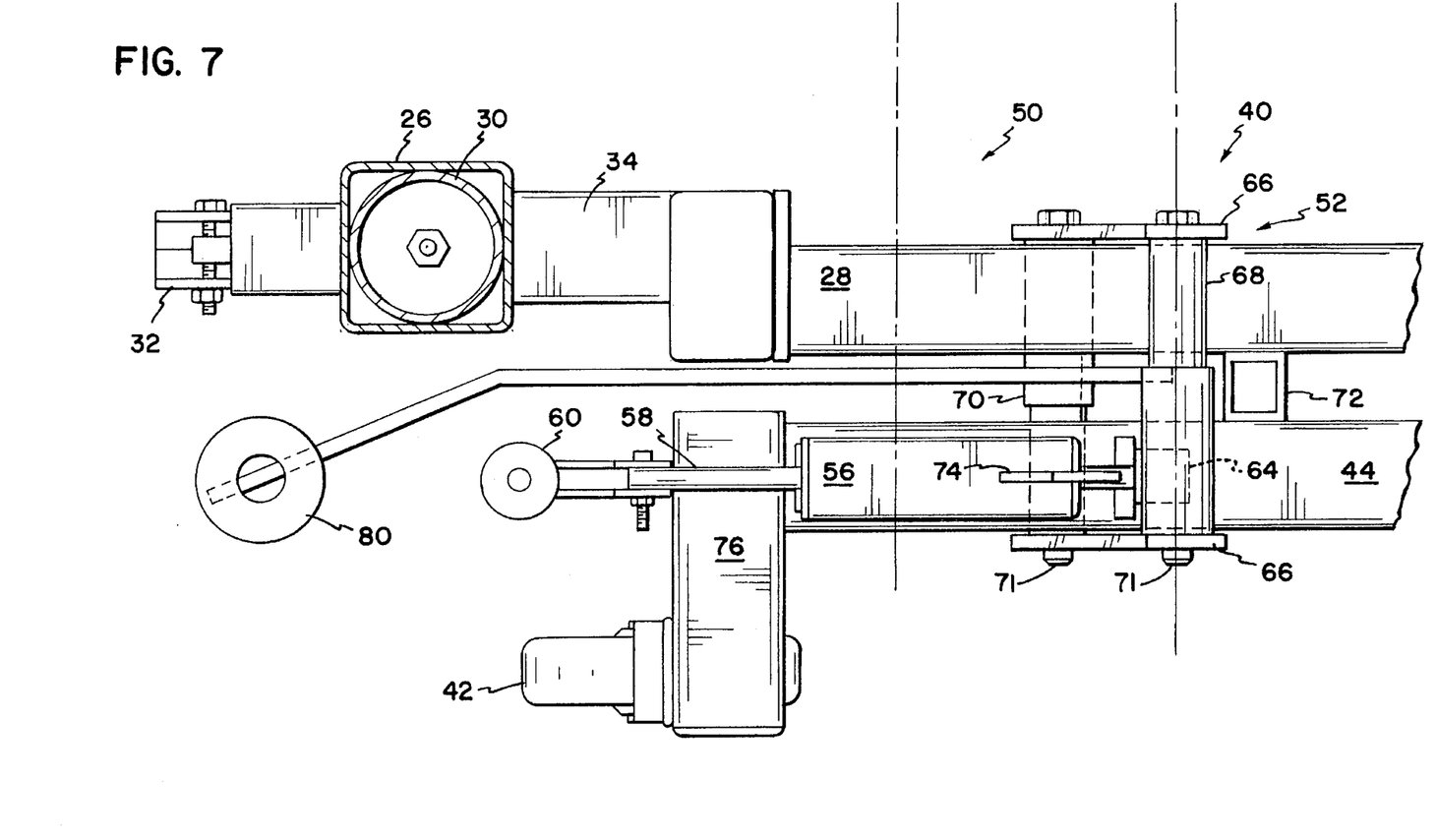
FIG. 7 shows a top plan view of the lift mechanism shown in FIG. 2.

In order to facilitate raising and lowering of the roller assembly 40, a lift mechanism 50 is utilized, as shown in FIG. 2. The lift mechanism 50 includes pivot links 52 connecting the roller assembly mounting bar 44 to the frame cross member 28. The pivot links 52 each include outside side members 66 extending on either side of the roller mounting bar 44 and frame cross member 28, as also shown in FIG. 7. The side members 66 are rotatably connected by pins 71 in an upper cross member 68 and a lower cross member 70. The upper cross member 68 is welded or otherwise connected to the frame cross member 28 while the lower cross member 70 is connected to the roller mounting bar 44. A center member 72 extends between the upper and lower cross members 68 and 70 intermediate the roller mounting bar 44 and frame cross member 28. An actuator pedal 80 extends outward beyond the leg 26 and is connected to the center member 72 and pivotally engages the bottom cross member 70. In addition, the lift mechanism 50 includes a spring 54 within a spring housing 56. The spring 54 connects to a rod 58 extending from a stop 64 to a release pedal 60. Release pedal 60 pivotally connects to the rod 58 at pivot point 62. The release pedal 60 pushes against the upper cross member 76 extending from the roller mounting bar 44 to move the rod 58 forward and back. Mounted at the end of the rod 58 is a sliding stop 64 which is utilized for allowing or preventing the pivot link 52 at the lift mechanism 50 to either raise or lower. On top of the housing 56 is a stop 74 which also engages the cross number 68 of the pivot link 52 at the end of its range of motion.

Figure 5:
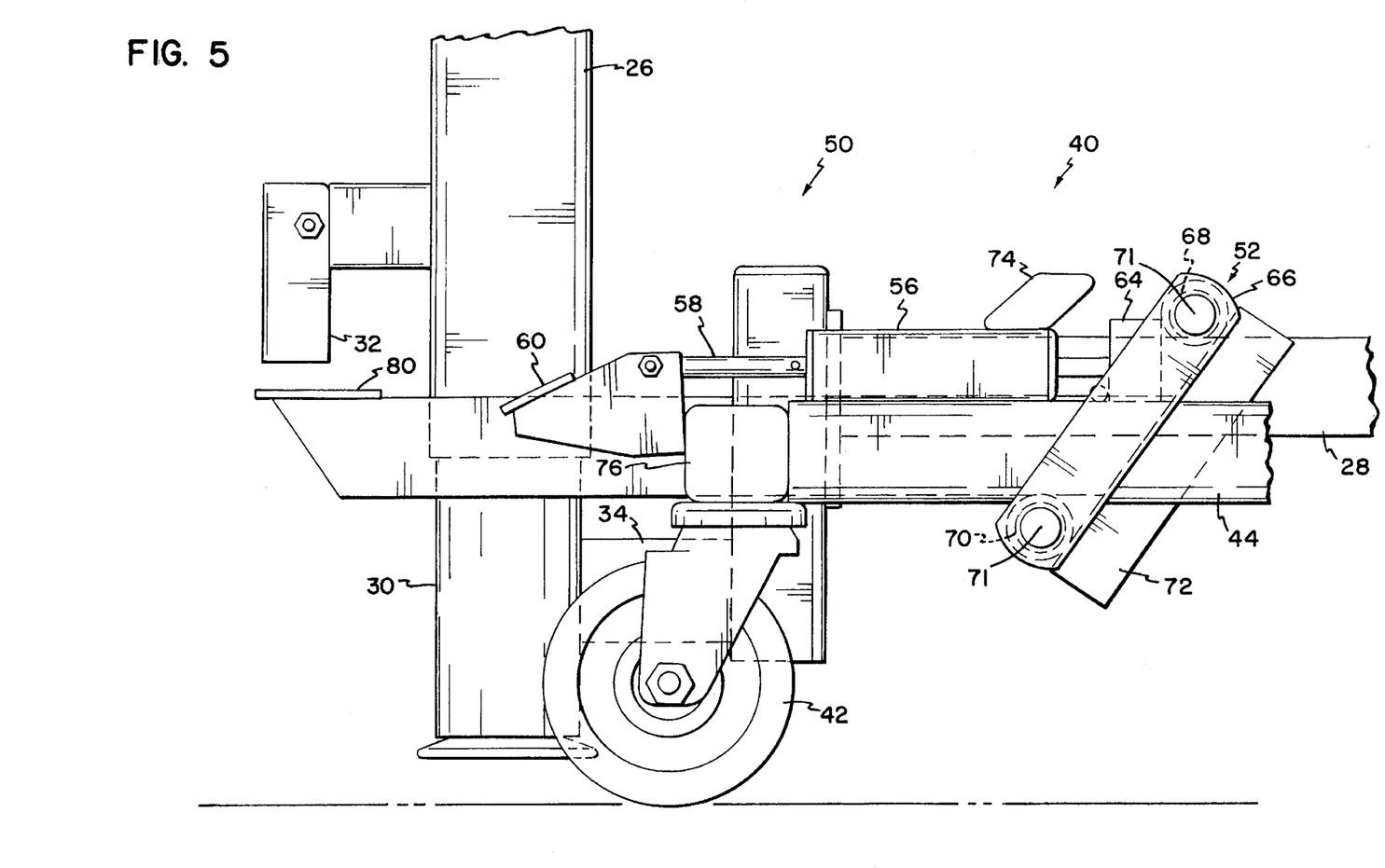
FIG. 5 shows a side elevational view of the lift mechanism shown in FIG. 2 with the stage in an intermediate position between fully raised and fully lowered.

At the position shown in FIG. 2, the stage 20 is elevated so that the legs 26 are lifted from the ground. At this position, the stage 20 is supported on the rollers 42 and may be easily moved. At this position, the block 64 supports the upper cross member 68 of the end pivot link 52. This prevents the frame cross member 28 from lowering and maintains the legs 26 elevated off the floor. To lower the stage 20, the actuator pedal 80 is depressed slightly. This actuation pivots the end link 52 upward and moves the upper cross member 68 off the stop 64 and into engagement with the upper stop 74 on top of the spring housing 56. It can be appreciated that depressing the actuator pedal 80 requires very little effort as there is great mechanical advantage for lifting the relatively short pivot links 52. At this point of lowering the stage 20, the release foot pedal 60 is depressed to slide the stop 64 out of the path of motion of the upper cross member 68. The weight of the stage 20 then forces the frame cross member 28 down and the upper cross member 68 moves below the top of the stop 64. Once the upper cross member 68 has cleared the stop 64, the release foot pedal 60 may be released so that the stop 64 may slide back to its original position as biased by the spring 54, as shown in FIG. 5. The weight of the stage 20 continues to force the frame downward until the legs 26 engage the ground, as shown in FIG. 6.

Figure 3:
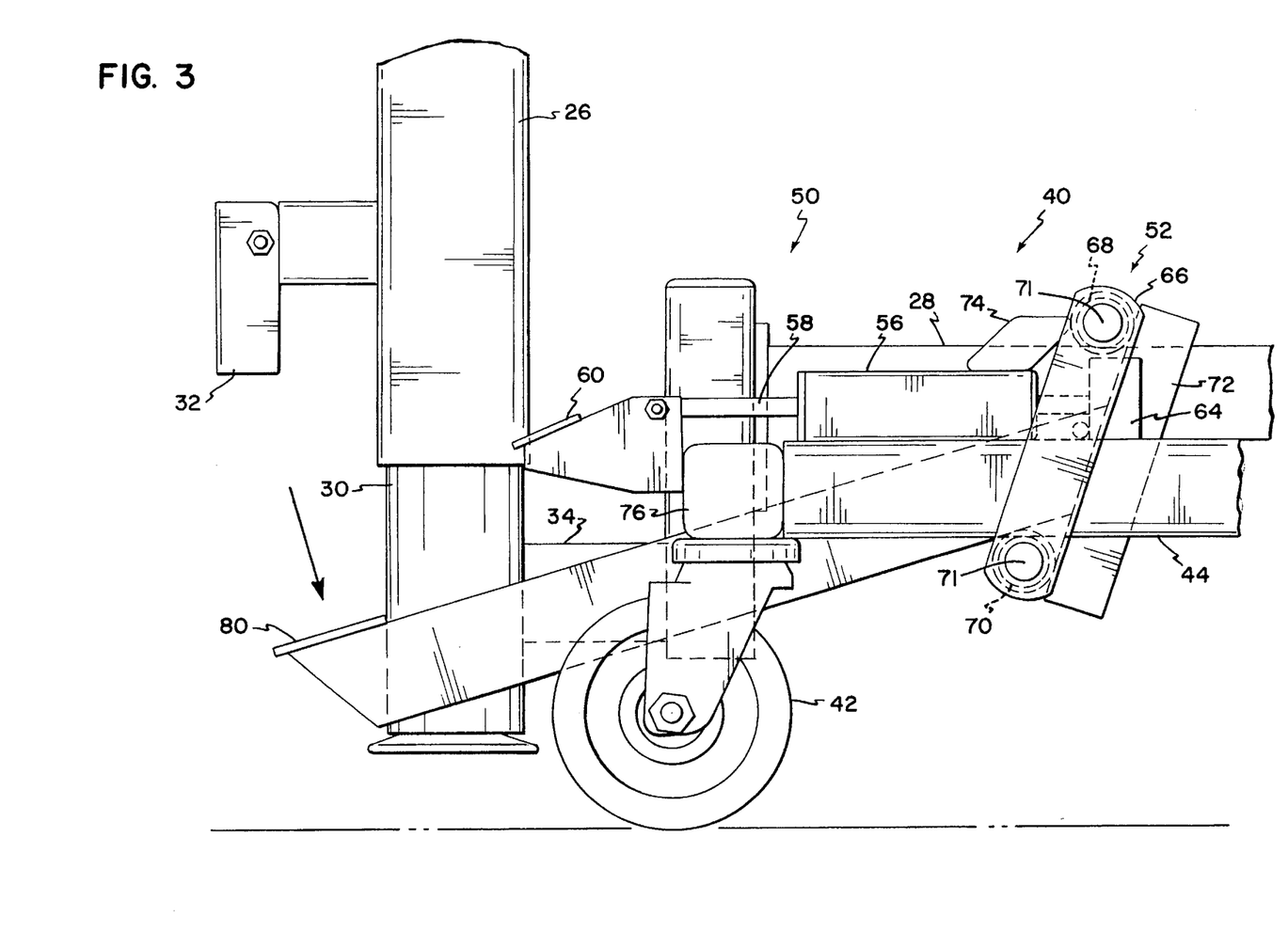
FIG. 3 shows a side elevational view of the lift mechanism shown in FIG. 2 with the actuator pedal depressed to lift an end pivot link off a stop.
Figure 4:
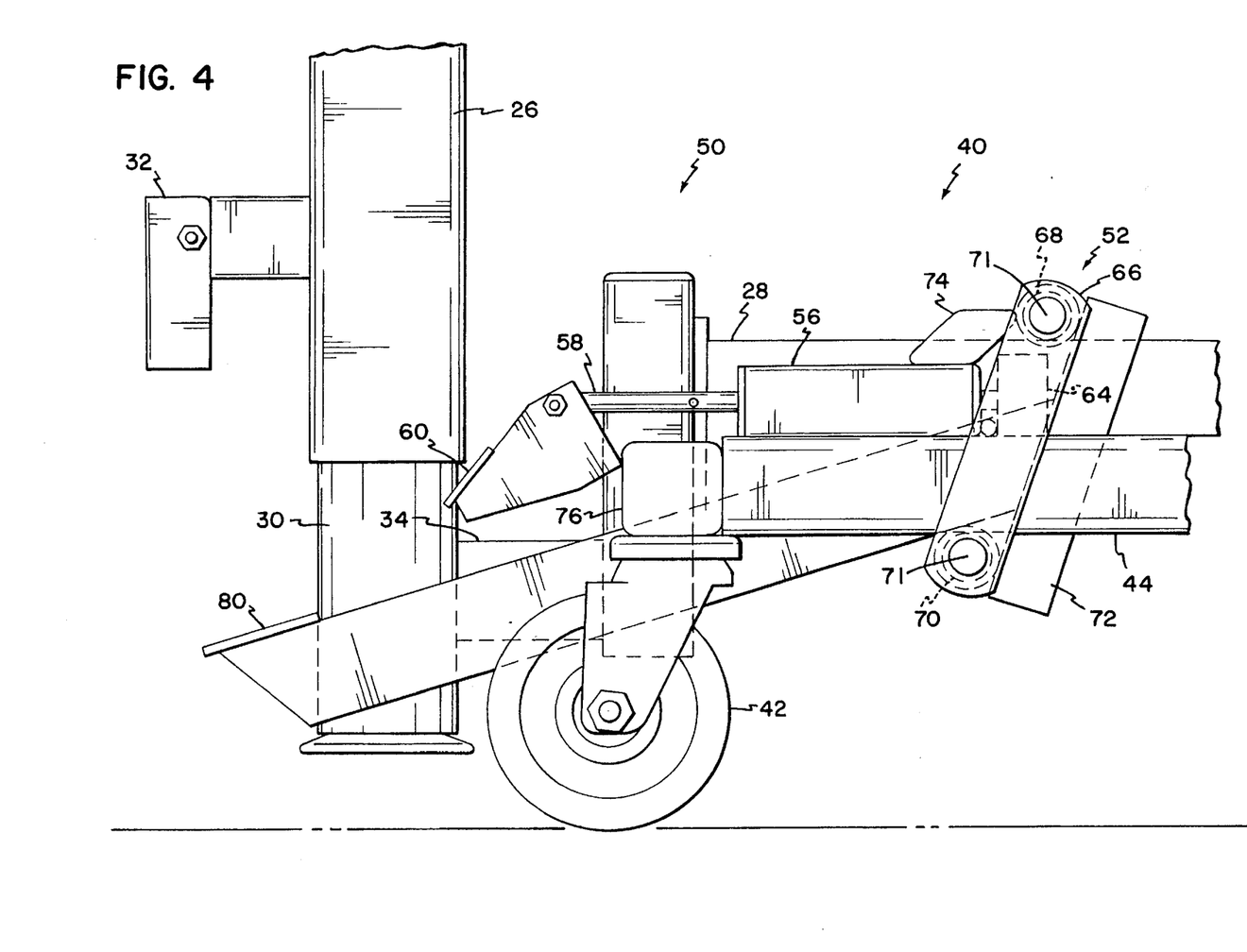
FIG. 4 shows a side elevational view of the lift mechanism shown in FIG. 2 with the actuator pedal depressed and a stop release pedal depressed and the stop retracted.
Figure 6:
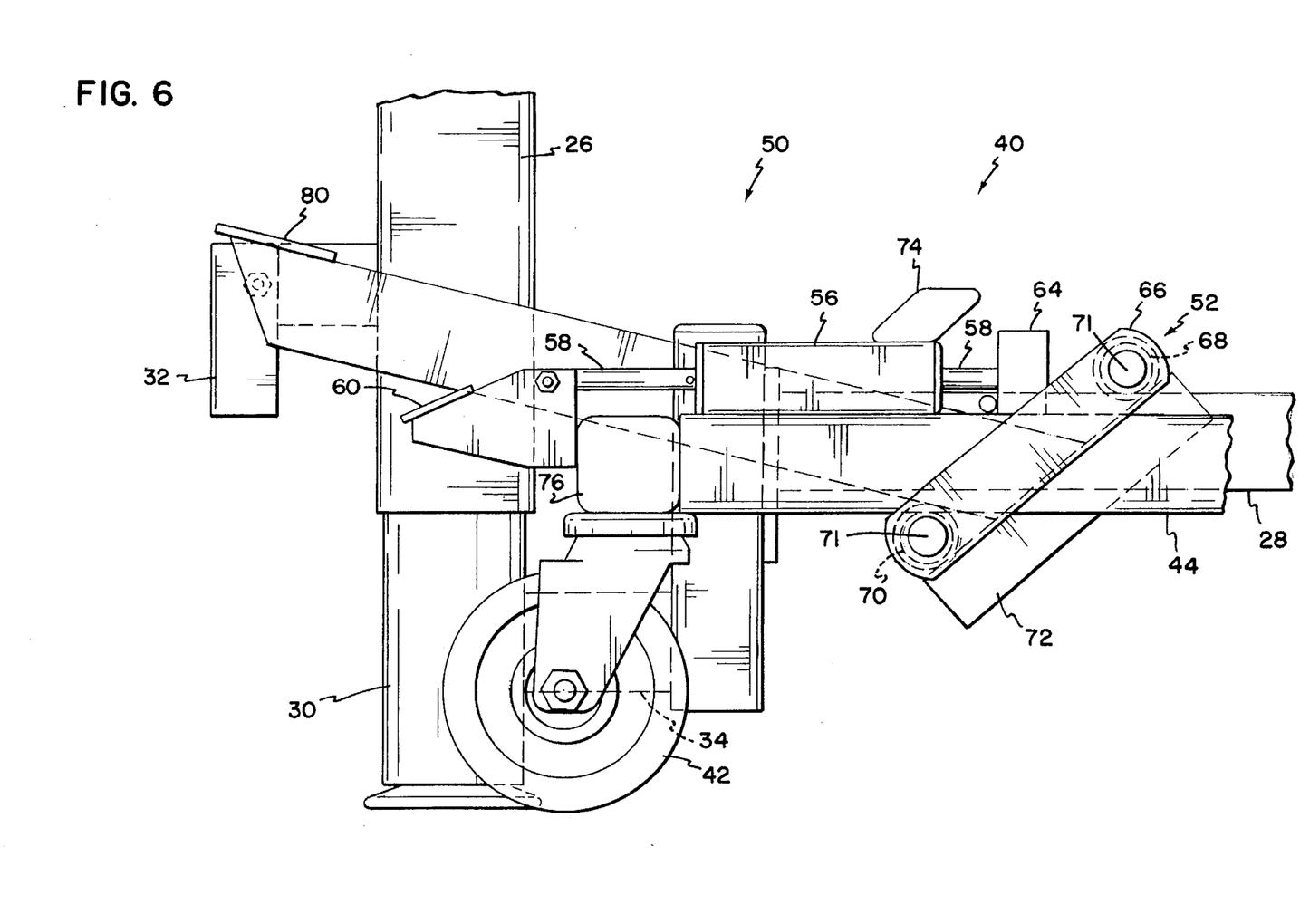
FIG. 6 shows a side elevational view of the lift mechanism shown in FIG. 2 with the stage fully lowered.

To raise the legs 26 off the ground so that the stage 20 may be rolled, the actuator pedal 80 must be depressed from its raised position shown in FIG. 6 to its depressed position, as shown in FIG. 4. In addition, as also shown in FIG. 4, the release pedal 60 must be depressed so that the stop 64 is retracted. This allows the upper cross member 68 to clear the top of the stop 64. At the point of motion shown in FIG. 4 with the upper cross member 68 above the top of the stop 64, the release pedal 60 may be released. The spring 54 biases the stop 64 into the path of motion of the upper cross member 68, as shown in FIG. 3. At this point, the actuator pedal 80 may be released and the weight of the stage forces pivot link 52 downward so that the upper cross member 68 rests on top of the stop 64 with the legs 26 elevated.

It can be appreciated that raising and lowering can be conducted with one foot as both the release pedal 60 and actuator pedal 80 are sufficiently close that they may be depressed with the same foot, as shown most clearly in FIG. 7.

Referring now to FIGS. 8–11, there is shown a second embodiment of a lift mechanism 100, generally designated 100. The lift mechanism 100 includes pivot links 102 connecting the frame cross member 28 to the roller mounting bar 44. Each pivot link 102 includes an upper cross member 116 connected to the frame cross member 28 and a lower cross member 118 connected to the roller mounting bar 44. A center link 120 connects the upper and lower members 116 and 118 and extends intermediate the roller mounting bar 44 and frame cross member 28. A stop pin 122 is mounted on the center member 120 and actuator pedal 124 connects to the pivot link 102 for pivoting back and forth for lifting and lowering the stage 20.

In addition, the lift mechanism 100 includes a release foot pedal 104 connected to the pivot link 102 by a linkage 106. The linkage 106 includes an end hook member 108 pivotally connected to a connecting member 112. The connecting member 112 and mounted to sleeve 107 rotating about pin 105 mounted to the foot pedal 104 pivots about the upper cross member 116 of the pivot link 102. The hook member 108 engages the end of roller mounting bar 44 and hooks about a rounded end portion 126.

Figure 8:
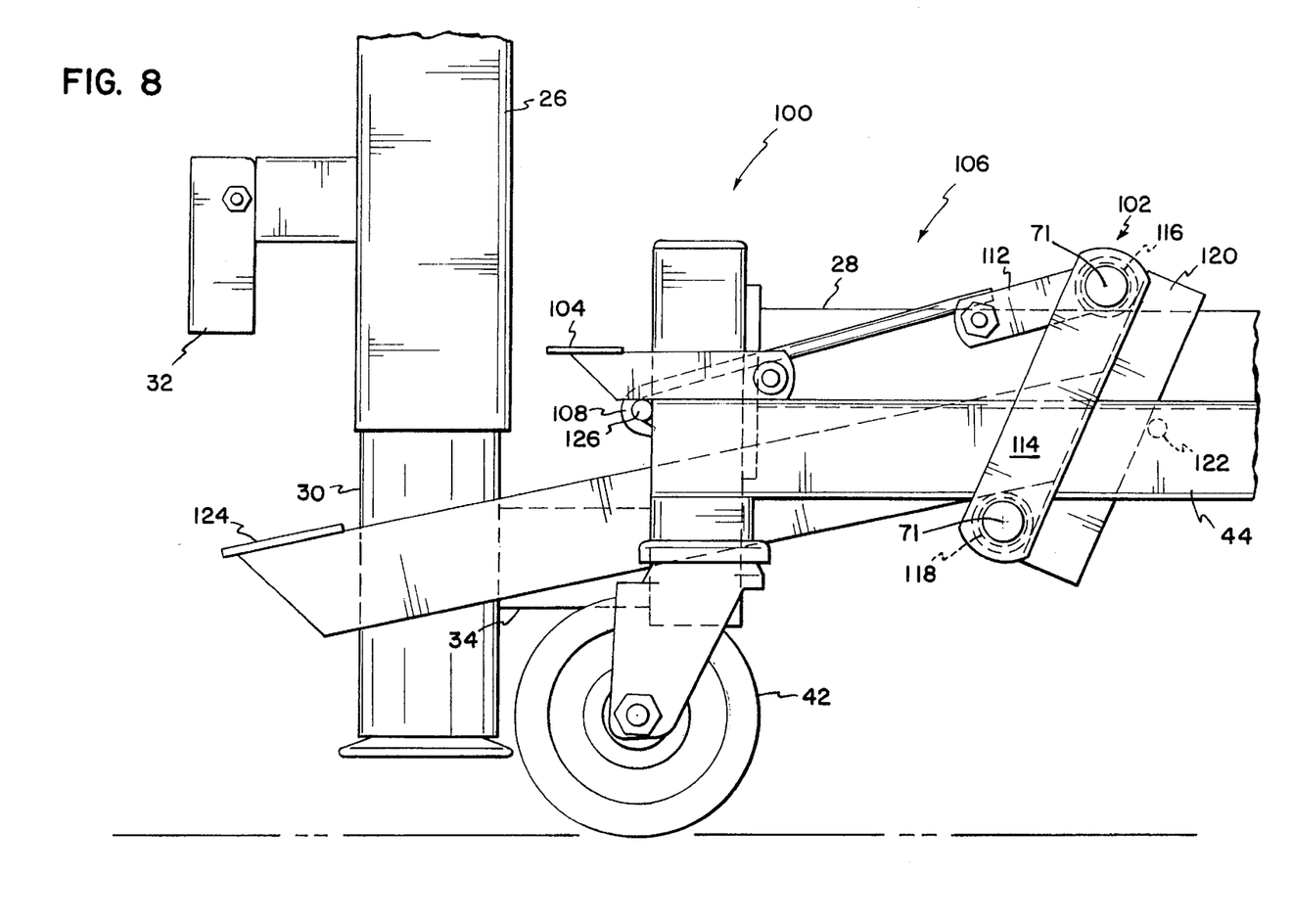
FIG. 8 shows a side elevational view of a second embodiment of a lift mechanism with the stage fully raised.

Referring now to FIG. 8, lift mechanism 100 is shown engaged so that stage 20 is lifted off the floor. In this position, the hook member 108 of the linkage 106 engages the rounded end portion 126 of the roller mounting bar 44. This prevents any downward movement of the stage 20 or mechanism 100 about the pivot links 102.

Figure 9:
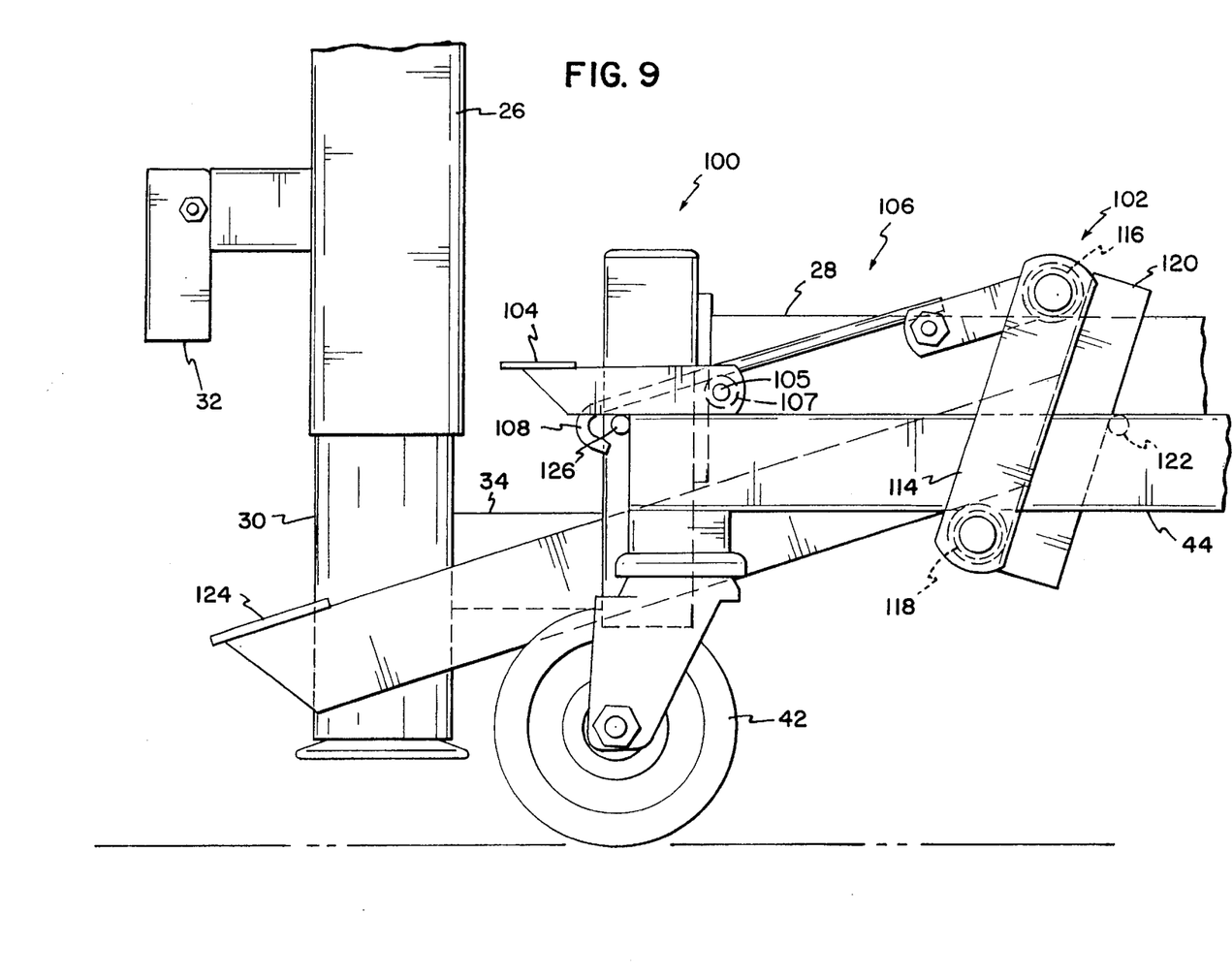
FIG. 9 shows a side elevational view of the lift mechanism shown in FIG. 8 with the actuator pedal depressed and the retaining hook disengaged.
Figure 10:
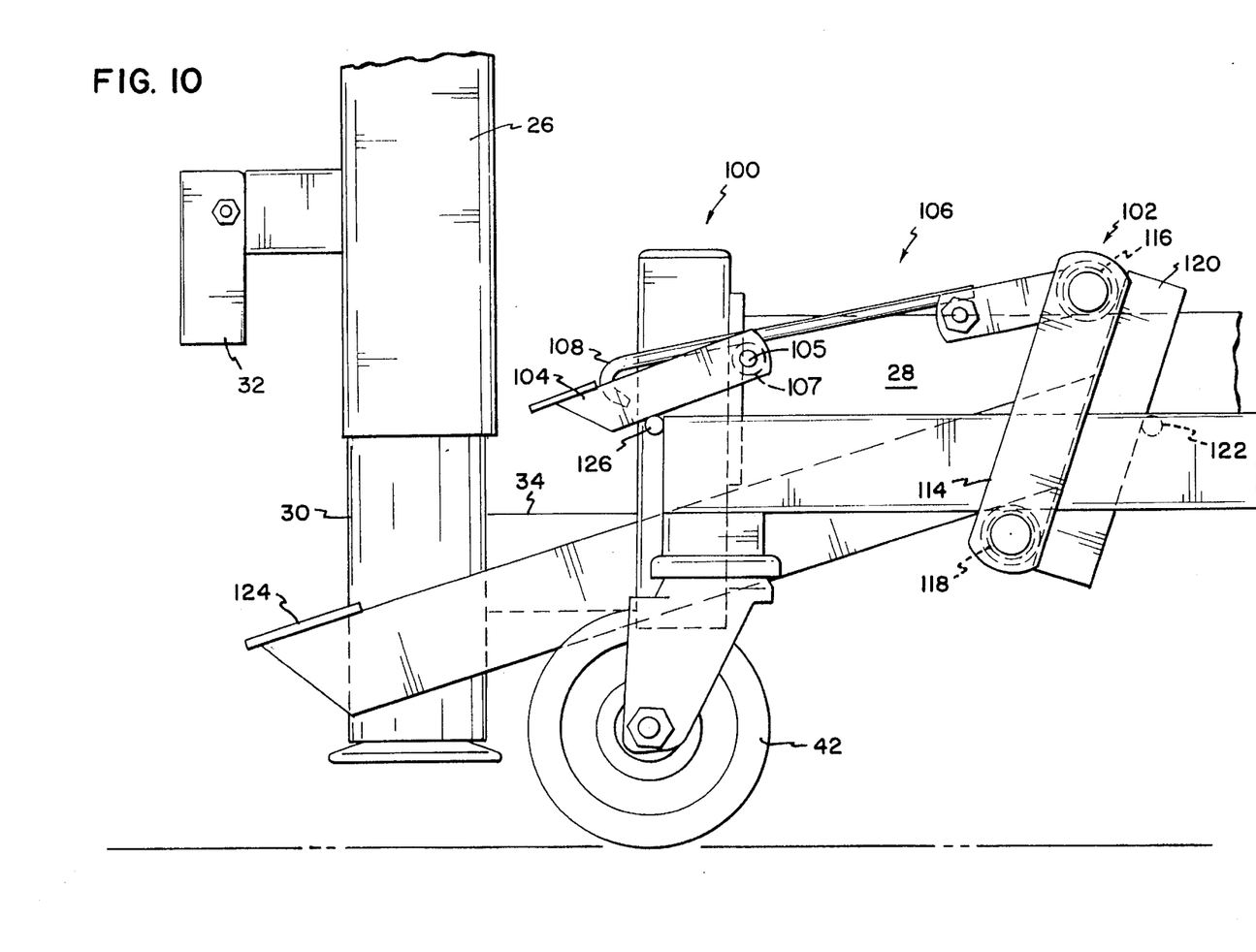
FIG. 10 shows a side elevational view of the lift mechanism shown in FIG. 8 with the actuator pedal depressed and the release pedal depressed; and, FIG. 11 shows a side elevational view of the lift mechanism shown in FIG. 8 with the stage fully lowered.

To lower the stage 20 so that the legs 26 will engage the ground, the actuator pedal 124 must be depressed slightly, as shown in FIG. 9. This rotates the pivot link 102 upward. The linkage 106 is also moved by this motion so that the hook member 108 is pushed away from the end portion 126. At this point, the release pedal 104 is depressed, thereby lifting the hook member 108 up and over the rounded end portion 126, as shown in FIG. 10. The weight of the stage 20 will naturally tend to push the pivot link 102 downward and pull the hook member 108 beyond the rounded end portion 126. It can be appreciated that the stage is lowered at this point by gradually allowing the actuator pedal 124 to be lifted upward. At the same time, the release pedal 104 must be depressed so that the hook member 108 remains raised above the rounded end portion 126. Once the hook member 108 has been pushed on top of the roller mounting bar 44 and past the end portion 126, the release pedal 104 may be released and the motion of the stage can be controlled with the actuator pedal 124. The weight of the stage 20 pushes the pivot links 102 downward and raises the actuator pedal 124 to the position shown in FIG. 11. As shown in FIG. 10, the downward motion of the actuator pedal is limited by the pin 122 engaging the frame cross member 28 so that the actuator pedal 124 cannot be pushed into the floor.

Figure 11:
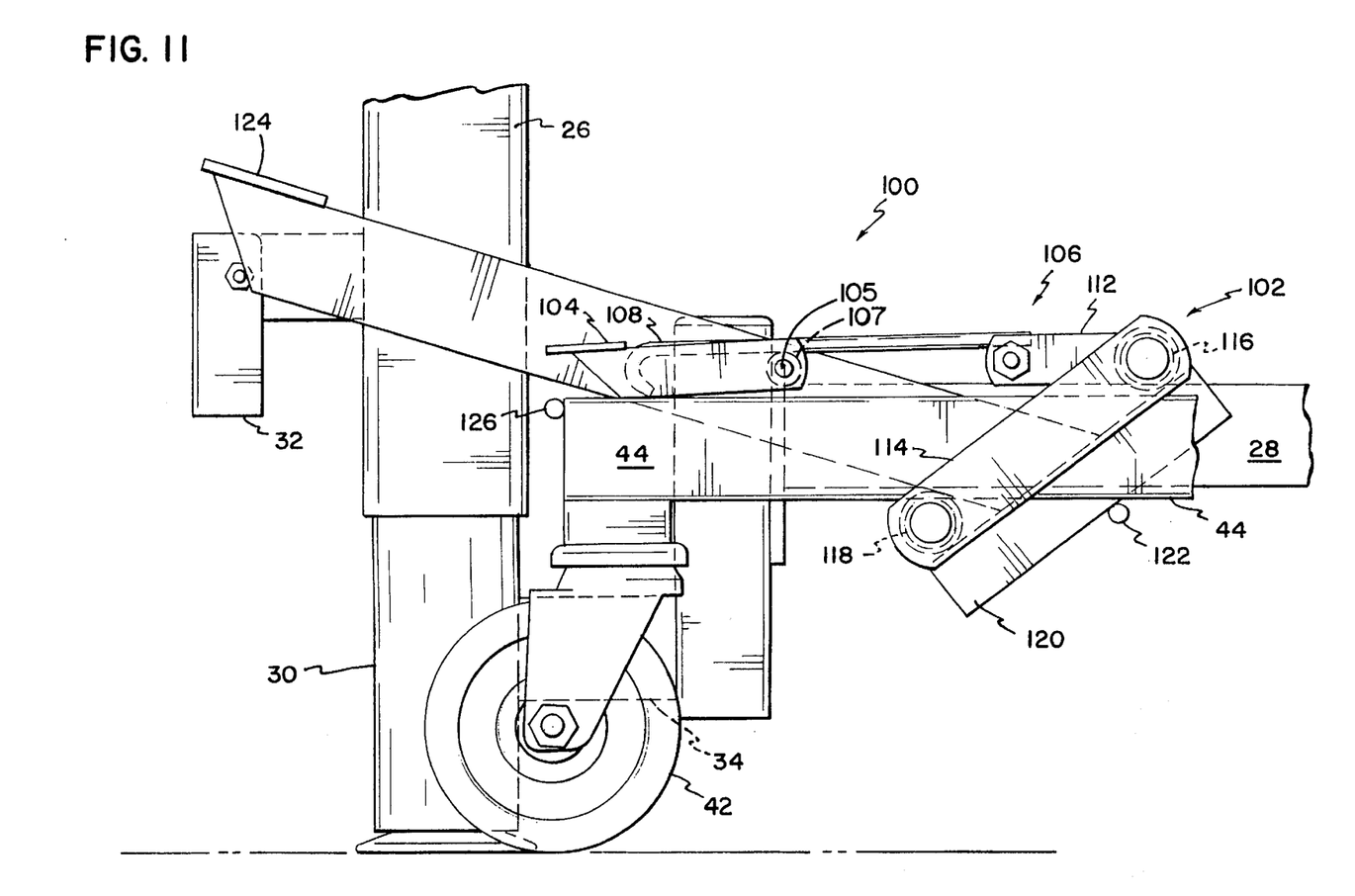

When the stage 20 is in the stationary position, the lift mechanism is in the position shown at FIG. 11. To elevate the legs 26, the actuator pedal 124 is depressed. This motion pivots the links 102 upward and raises the frame cross member 28 and the entire stage 20, as shown in FIG. 9. The pedal must be depressed far enough so that the hook member 108 extends down around the end portion 126. Once the hook 108 has been lowered to a point below the end portion 126, the actuator pedal 124 may be released. The weight of the stage will then pivot the link 102 downward pulling the linkage 106 away from the leg 26. This pulls the hook member 108 around the end portion 126. The hook 108 prevents the frame cross member 28 from moving downward any further and keeps the legs 26 raised off the floor. The stage is supported on the rollers 42 at this point and may be rolled freely in any direction.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A lift apparatus having a first member elevationally adjustable relative to a second member, comprising:

(a) one or more pivoting links connecting the first and second members, each of the pivoting links including a lower cross member pivotally connecting the second member to the pivoting link, and an upper cross member pivotally connecting the first member to the pivoting link;

(b) a first actuating member directly attached to a first one of the pivoting links, the first actuating member including a portion pivoting about the lower cross member; and, (c) a second actuating member connected to a stop device moveable between first and second positions, wherein in the first position the stop device engages the second member and the first pivoting link, and in the second position the stop device disengages one of the second member or the first pivoting link for selectively limiting relative motion between the first and second members.

2. A lift apparatus according to claim 1, wherein a first one of the pivoting links includes a center member connecting the upper and lower cross members, and wherein the first actuating member attaches to the center member.

3. A lift apparatus according to claim 1, wherein the second member extends horizontally and includes casters.

4. A lift apparatus according to claim 1, wherein the first actuating member includes a foot pedal.

5. A lift apparatus according to claim 1, wherein the first and second members are substantially parallel.

6. A lift apparatus according to claim 5, wherein the first and second actuating members extend longitudinally from a first end of the second member.

7. A stage including a roller assembly, comprising;

(a) a supporting framework including legs supporting the stage;

(b) the roller assembly including a plurality of rollers;

(c) a linkage comprising a plurality of links pivotally connecting the roller assembly to the framework for raising and lowering the framework between a first position wherein the legs engage the ground and a second position wherein the legs are lifted off the ground;

(d) foot actuated means directly engaging a first one of the plurality of links for actuating the linkage; and, (e) foot actuated selectively operable motion limiting means for limiting relative movement of the roller assembly relative to the stage comprising a stop device moveable between a first position wherein the stop device engages the first link and the roller assembly and a second position wherein the stop device disengages one of the first link or the roller assembly.

8. A stage according to claim 7, wherein the foot actuated means and the foot actuated selectively operable motion limiting means extend from a first end of the roller assembly.

9. An apparatus for raising and lowering a first member relative to a second member, comprising:

(a) a linkage including a plurality of links pivotally connecting the first member to the second member providing relative vertical movement between the first and second members from a first position to a second position;

(b) a first pedal connected to the linkage for actuating relative motion between the first and second members; and (c) a second pedal connected to a stop device moveable between first and second positions, wherein in the first position the stop device engages the second member and a first link of the linkage, and in the second position the stop device disengages one of the second member or the first link for selectively limiting the relative vertical motion between the first and second members; wherein the first and second pedals are selectively configured to be accessible by an operator's foot in the first and second positions.

10. An apparatus according to claim 9, wherein the first pedal includes a first end connecting to the linkage and the first pedal pivotally engages the first member and pivots the pedal thereabout.

11. A roller apparatus, comprising:

(a) a frame structure;

(b) a roller device comprising a mounting member and a plurality of rollers attached thereto;

(c) a linkage connecting the roller device to the frame structure and providing for lowering and raising the frame structure between a first raised position and a second lower position;

(d) a foot pedal mounted directly to the linkage for actuating the linkage; and, (e) a hook member connected to the linkage for selectively engaging an end of the mounting member and limiting relative motion between the roller device and the frame structure.

12. A roller apparatus according to claim 11, further comprising a second pedal connected to the hook member.

13. A roller apparatus according to claim 12, wherein the foot pedal and the second pedal are configured to be operated with one foot at the same time.

14. A roller apparatus, comprising:

(a) a frame structure;

(b) a roller device comprising a mounting member and a plurality of rollers attached thereto;

(c) a linkage connecting the roller device to the frame structure and providing for lowering and raising the frame structure between a first raised position and a second lower position;

(d) a foot pedal mounted directly to the linkage for actuating the linkage; and, (e) means for selectively limiting relative motion between the roller device and the frame structure comprising a slidable stop member engaging the linkage in a first position and providing for free movement of the linkage in a second position.

15. A roller apparatus according to claim 14, wherein the motion limiting means further comprises biasing means for biasing the stop toward the first position.

* * * * *

UNITED STATES PATENT AND TRADEMARK OFFICE
CERTIFICATE OF CORRECTION

PATENT NO. : 5,615,451
DATED : April 1, 1997
INVENTOR(S) : Virgil D. Peterson, Gary W. Andert, Rollin D. Botts It is certified that error appears in the above-identified patent and that said Letters Patent is hereby corrected as shown below:

On the title page, item [56], insert the following:

2,843,392 07/1958 Simpkins 280 43.14;

3,054,623 09/1962 Simpkins 280 43.14;

5,349,789 09/1994 Andert et al., 52.

Signed and Sealed this

Twenty-third Day of December, 1997

Attest:

BRUCE LEHMAN

Attesting Officer

Commissioner of Patents and Trademarks